(12) United States Patent
Kleckner

(10) Patent No.: US 6,601,280 B1
(45) Date of Patent: Aug. 5, 2003

(54) METHOD OF CONVERTING A MOLD

(75) Inventor: James P. Kleckner, Akron, OH (US)

(73) Assignee: Bridgestone/Firestone Research, Akron, OH (US)

( * ) Notice: Subject to any disclaimer, the term of this patent is extended or adjusted under 35 U.S.C. 154(b) by 37 days.

(21) Appl. No.: 09/651,813

(22) Filed: Aug. 30, 2000

(51) Int. Cl.$^7$ .......................... B23P 13/00; B60B 11/11; B60B 101/00; B60B 103/00; B60B 107/00
(52) U.S. Cl. .................. 29/401.1; 29/557; 152/209.21; 152/902; 164/17; 425/28.1
(58) Field of Search ........................... 152/209.21, 902; 425/28.1, 46; 264/219; 76/107.1; 408/1 R; 164/6, 17; 29/401.1, 557

(56) References Cited

U.S. PATENT DOCUMENTS

| | | |
|---|---|---|
| D75,774 S | 7/1928 | Coleman et al. |
| 3,327,570 A * | 6/1967 | McClarran |
| 4,481,992 A * | 11/1984 | Takigawa et al. |
| 4,691,431 A * | 9/1987 | Hayata |
| 4,736,783 A | 4/1988 | Motomura et al. |
| 4,747,435 A | 5/1988 | Trabandt et al. |
| 5,031,680 A * | 7/1991 | Kajikawa et al. |
| 5,234,326 A * | 8/1993 | Galli et al. |
| 5,386,861 A | 2/1995 | Overhoff et al. |
| 5,535,798 A | 7/1996 | Nakamura et al. |
| 5,820,796 A * | 10/1998 | Howald et al. |
| 6,250,354 B1 * | 6/2001 | Kawai |

FOREIGN PATENT DOCUMENTS

| | | | |
|---|---|---|---|
| DE | 3824897 | * | 1/1990 |
| EP | 0544236 A | | 6/1993 |
| GB | 460338 | * | 1/1937 |
| JP | 3-57704 | * | 3/1991 |
| JP | 4-201606 | * | 7/1992 |
| JP | 04221207 | | 8/1992 |
| JP | 05169920 | | 7/1993 |
| JP | 6-312603 | * | 11/1994 |
| JP | 9-136515 | * | 5/1997 |
| JP | 11-151912 | * | 6/1999 |

* cited by examiner

Primary Examiner—Steven D. Maki
(74) Attorney, Agent, or Firm—Renner, Otto, Boisselle & Sklar, LLP

(57) ABSTRACT

A tread pattern having at least one circumferential groove and transverse grooves extending from the circumferential groove defining tread blocks there between. The tread blocks include sidewalls limiting the longitudinal groove laterally and projections projecting from the sidewalls into the circumferential groove. The width of each of the projections is less than 10% the circumferential dimension of the respective tread block. To convert a mold having elements that produce tread blocks with substantially flat sidewalls into a mold that produces the tread pattern, channels are machines into the sidewalls of the mold elements.

14 Claims, 1 Drawing Sheet

METHOD OF CONVERTING A MOLD

FIELD OF THE INVENTION

This invention relates to tread pattern for a vehicle tire with at least one circumferential longitudinal groove and transverse grooves that define tread blocks therebetween.

BACKGROUND OF THE INVENTION

The tread pattern for a vehicle tire typically includes at least one circumferential longitudinal groove and transverse grooves that run perpendicularly or diagonally relative to the circumferential longitudinal groove. The longitudinal and transverse grooves define the boundaries of the tread blocks therebetween. The surface of the tread block which comes into contact with the ground transmits traction and braking forces. The edges of the tread block which contact the road surface, as well as any additional edges added by way of slots or sipes in the contact surface of the tread block, enhance traction under wet conditions. The sides of the tread blocks facing the circumferential grooves are typically flat and smooth. In other instances, however, such as tires designed specifically for snow conditions, the density of the vertical edges in the circumferential direction is increased by slots or sipes in these side walls.

During the tire-making process, the grooves of the tread pattern are formed by metallic elements of the molds and the spaces between these metallic elements form the tread blocks. To change the profile of the tread blocks, the metallic elements must be replaced. This replacement usually translates into downtime and expense for the tire-making facility.

Accordingly, to convert a tire manufacturing line that is producing tires with substantially flat tread blocks into one that can produce snow tires with slots or sipes in the tread blocks, the metallic elements must be replaced or substantially modified. Specifically, the metallic elements must be provided with projections corresponding to the desired slots or sipes. Also, depending on the size, shape and arrangement of these sipes or slots, the stiffness of the tread block may be reduced. Furthermore, the footprint area, percent void and/or appearance of the tread block may be compromised when compared to an analogous tread block without such sipes or slots.

The inventor therefore appreciated that a need remains for a tire having a tread pattern with an increased edge density that could be made without the conversion of the mold being overly time consuming or expensive.

SUMMARY OF THE INVENTION

A need exists for a tire having a tread pattern with an increased edge density that could be made without the conversion of the mold being overly time consuming or expensive.

The present invention provides a tread pattern including tread blocks having projections projecting from the sidewalls into the circumferential groove. The width of each of the projections is preferably less than 10% of the circumferential dimension of the respective tread block. To convert a mold having elements that produce tread blocks with substantially flat sidewalls into a mold that produce this tread pattern, channels are machined into the sidewalls of the mold elements. In this manner, an existing mold can be retrofitted in a matter of hours and with relatively inexpensive equipment. Thus, the present invention provides a tread pattern having an increased edge density that can be made without the conversion of the mold being overly time consuming or expensive. Moreover, the present invention allows an increased edge density without reducing the stiffness of the tread block and/or compromising its footprint area, percent void and/or appearance when compared to an analogous tread block.

DRAWINGS

DETAILED DESCRIPTION

Figure 1:
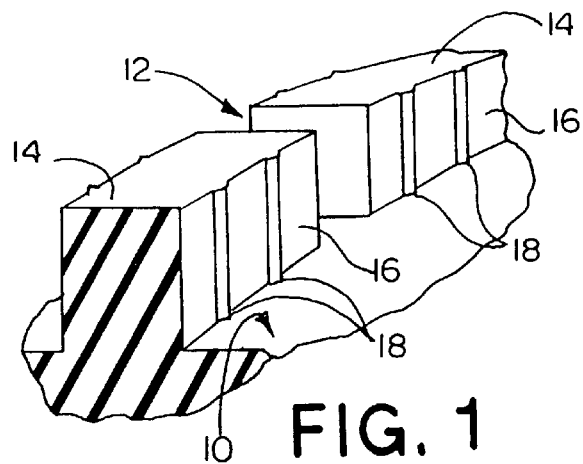
FIG. 1 is a side perspective view of a portion of a tread pattern according to the present invention.

Referring now to the drawings in detail, and initially to FIG. 1, a portion of a tread pattern according to the present invention is shown. The tread pattern includes circumferential longitudinal grooves 10 and transverse grooves 12 that run perpendicularly or diagonally relative to the circumferential longitudinal grooves 10. The longitudinal and transverse grooves 10 and 12 define boundaries of tread blocks 14 therebetween.

The illustrated tread blocks 14 are roughly rectangular prism shaped members and each has a substantially flat side 16 facing the circumferential groove 10. According to the present invention, this wall 16 is interrupted by at least one projection 18.

Figure 2:
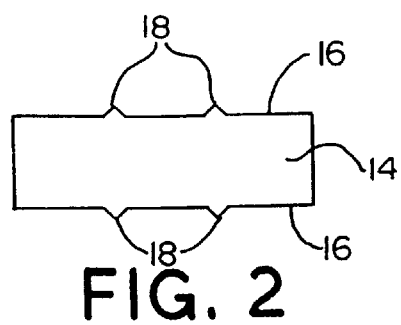
FIG. 2 is a top view of one of the tread blocks.

In the embodiment illustrated in FIGS. 1 and 2, the tread blocks 14 each includes a pair of projections 18 on each of its sides 16. The projections 18 are positioned to roughly divide the flat side 16 into three equal sections in the circumferential direction. In the embodiment illustrated in FIG. 3, the tread blocks 14 include one projection 18 on each of its sides 16, this projection 18 being positioned to divide the flat side 16 into two equal sections. Other arrangements of projections 18 are possible with and contemplated by the present invention. The illustrated projections 18 are arranged in the same manner on both of the sides 16 of the tread block 14 so that the tire may be installed on either side of the vehicle.

Figure 3:
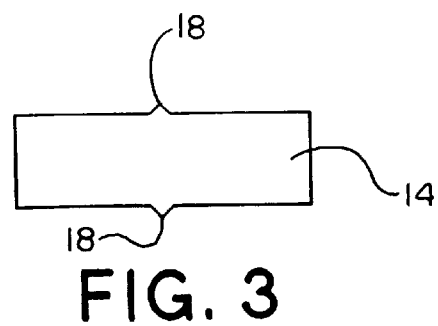
FIG. 3 is a top view of a modified form of the tread block.

As is best seen in FIGS. 2 and 3, the projections 18 are triangular in cross-sectional shape. This shape may be used because of its ease incorporating into an existing mold piece, as is explained in more detail below. However, other shapes may work equally as well or better, depending on the intended driving circumstances. For example, the projections 18 could have a roughly rectangular cross-sectional shape with its distal end being either rounded or having sharp perpendicular corners. The projections 18 could be rectangular, semi-circular, trapezoidal, elliptical, asymmetric or other shapes that may be found advantageous for reasons of mold release, winter traction, ease of manufacture, hydraulic flow on wet surfaces, and/or pattern noise reduction. Any shape and/or orientation which desirably increases the edge density of the tread block 14, as well as satisfying other tread design factors, is possible with and contemplated by the present invention.

The protrusions 18 may be perpendicular to the tread's contact surface, but other orientations may be used to accomplish mold release, winter traction, ease of manufacture, hydraulic flow on wet surfaces, and/or pattern noise reduction. In fact, for example, the projections 18 of the present invention may be particularly suited to tread designs in which groove walls are not perpendicular to the contact surface, such as V-shaped grooves designed for resisting hydroplaning in standing water.

The projections 18 are relatively small when compared to the flat side 16 to stabilize and lock impacted snow. Additionally, this dimensional relationship does not reduce the stiffness of the tread blocks 14 and does not significantly change the footprint area, percent void, or appearance of the tread blocks 14 when compared to an analogous "projection-less" tread block. Particularly, the height of the projection (i.e., the distance between the flat side 16 and the distal end of the projection) is less than 10%, is less than 7%, or is less than 5% of the transverse dimension of the tread block. The extent of the protrusions 18 may be from the floor of the tread groove to the contacting surface of the tread block, or any portion of this expanse.

The width of the projection (i.e., the span of the base of projection) is less than 10%, is less than 7% or is less than 2% of the circumferential dimension of the tread block 14. For example, the height and/or width of the projection 18 may be between 3 mm and 5 mm, may be between 1 mm and 3 mm, or may be between 0.5 mm and 2 mm. Dimensions of the projections may be optimized for such factors as release from the mold, circumferential flow of water to avoid hydroplaning, the width of the tread groove, and the particular service application of the tire. A graduated dimension from the bottom of the groove decreasing to zero at the tread surface is also contemplated with this invention.

Figure 4:
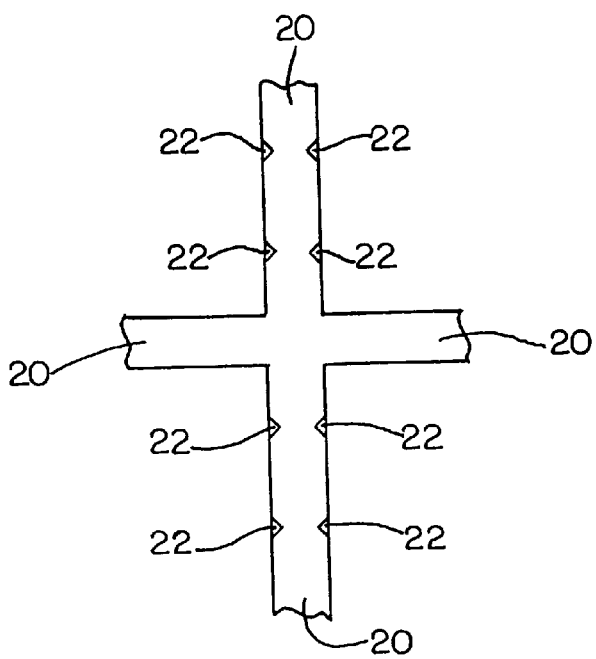
FIG. 4 is a top view of metallic elements of a mold for making the tread pattern according to the present invention.

Referring now to FIG. 4, the metallic elements 20 of a mold for making the tire are schematically shown. During the tire-making process, the grooves 10 and 12 of the tread pattern are formed by the metallic elements 20. The spaces between the metallic elements 20 form the tread blocks 14. To convert a tire manufacturing line that is producing tires with substantially flat tread blocks into one that can produce a tire with the projections 18, the metallic elements 20 must merely be modified. Specifically, small channels 22 are machined into the sides of the metallic elements 20 to form the projections 18. An existing mold can be retrofitted in a matter of hours and with relatively inexpensive equipment.

One may now appreciate that the present invention provides a tire having a tread pattern with an increased edge density that could be made without the conversion of the molding process being overly time consuming or expensive. Various modifications and alterations that do not depart from the scope and spirit of this invention will become apparent to those skilled in the art. This invention is not be unduly limited to the illustrative embodiments set forth herein.

What is claimed is:

1. A method of converting a mold having elements that produce tread blocks with substantially flat sidewalls into a mold that produce a tread having a tread pattern comprising at least one circumferential groove and transverse grooves extending from the circumferential groove; the circumferential and transverse grooves defining tread blocks therebetween, each tread block having a circumferential dimension, a transverse dimension, and a radial dimension; the tread blocks including sidewalls limiting the circumferential groove laterally and projections projecting from the sidewalls into the circumferential groove; each of the projections having a width corresponding to the circumferential dimension of the respective tread block and a height corresponding to the transverse dimension of the respective tread block; the width of each of the projections being less than 10% of the circumferential dimension of the respective tread block; said method comprising the step of machining channels into the elements of the mold to produce the projections.

2. A method as set forth in claim 1 wherein the width of each of the projections is less than 7% of the circumferential dimension of the respective tread block.

3. A method as set forth in claim 2 wherein the width of each of the projections is less than 2% of the circumferential dimension of the respective tread block.

4. A method as set forth in claim 1 wherein the width of the projection is between 3 mm and 5 mm.

5. A method as set forth in claim 1 wherein the width of the projection is between 1 mm and 3 mm.

6. A method as set forth in claim 5 wherein the width of the projection is between 0.5 mm and 2 mm.

7. A method as set forth in claim 1 wherein the height of each of the projections is less than 10% of the transverse dimension of the tread block.

8. A method as set forth in claim 7 wherein the height of each of the projections is less than 7% of the transverse dimension of the tread block.

9. A method as set forth in claim 8 wherein the height of each of the projections is less than 5% of the transverse dimension of the tread block.

10. A method as set forth in claim 4 wherein the height of the projection is between 3 mm and 5 mm.

11. A method as set forth in claim 10 wherein the height of the projection is between 1 mm and 3 mm.

12. A method as set forth in claim 11 wherein the height of the projection is between 0.5 mm and 2 mm.

13. A method as set forth in claim 1 wherein the projections are triangular in cross-sectional shape.

14. A method as set forth in claim 1 wherein the projections are arranged in the same manner on the sidewalls of the tread blocks on opposite sides of the circumferential groove so that a tire incorporating the tread may be installed on either side of the vehicle.

* * * * *